(12) United States Patent
Yu et al.

(10) Patent No.: US 11,664,934 B2
(45) Date of Patent: May 30, 2023

(54) ADAPTIVE TRANSMISSION METHOD FOR SATELLITE COMMUNICATION, APPARATUS, AND SYSTEM

(71) Applicant: Huawei Technologies Co., Ltd., Shenzhen (CN)

(72) Inventors: Rongdao Yu, Shenzhen (CN); Jun Chen, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 150 days.

(21) Appl. No.: 17/379,600

(22) Filed: Jul. 19, 2021

(65) Prior Publication Data
US 2021/0391958 A1 Dec. 16, 2021

Related U.S. Application Data

(63) Continuation of application No. PCT/CN2020/073911, filed on Jan. 22, 2020.

(30) Foreign Application Priority Data

Jan. 29, 2019 (CN) .......................... 201910083857.7

(51) Int. Cl.
*H04L 1/1812* (2023.01)
*H04B 7/185* (2006.01)
(Continued)

(52) U.S. Cl.
CPC ....... *H04L 1/1819* (2013.01); *H04B 7/18513* (2013.01); *H04L 1/0009* (2013.01);
(Continued)

(58) Field of Classification Search
None
See application file for complete search history.

(56) References Cited

U.S. PATENT DOCUMENTS

2016/0182193 A1 6/2016 Tomeba et al.
2018/0083694 A1* 3/2018 Rajagopalan ...... H04B 7/18519
(Continued)

FOREIGN PATENT DOCUMENTS

CN 101640586 A 2/2010
CN 101801097 A 8/2010
(Continued)

OTHER PUBLICATIONS

ZTE et al., "Considerations on CQI/MCS table(s) and related aspects for URRLLC", 3GPP TSG RAN WG1 Meeting #92, R1-1801631, Athens, Greece, Feb. 26-Mar. 2, 2018, 18 pages.
(Continued)

Primary Examiner — Anh Vu H Ly
(74) Attorney, Agent, or Firm — Slater Matsil, LLP

(57) ABSTRACT

This application discloses an adaptive transmission method for satellite communication. First, a receive end determines a redundancy version index; second, the receive end feeds back a redundancy version index signal to a transmit end; then, the transmit end receives the redundancy version index fed back by the receive end, and performs operations such as demodulation and decoding on the redundancy version index signal, to obtain the redundancy version index; and then, the transmit end obtains a corresponding redundancy version combination based on the obtained redundancy version index; and finally, the transmit end selects a proper diversity mode for transmission based on the obtained redundancy version combination.

16 Claims, 9 Drawing Sheets

(51) Int. Cl.
  *H04L 1/00* (2006.01)
  *H04L 1/1607* (2023.01)
  *H04W 72/12* (2023.01)
  *H04L 27/20* (2006.01)

(52) U.S. Cl.
  CPC .......... *H04L 1/0071* (2013.01); *H04L 1/1607* (2013.01); *H04W 72/12* (2013.01); *H04B 7/185* (2013.01); *H04L 27/20* (2013.01)

(56) References Cited

U.S. PATENT DOCUMENTS

| | | | |
|---|---|---|---|
| 2019/0104535 A1* | 4/2019 | Golitschek Edler von Elbwart ... | H04W 72/1268 |
| 2019/0260547 A1* | 8/2019 | Nammi ................ | H04L 5/0058 |
| 2019/0394769 A1* | 12/2019 | Gilda ................ | H04L 1/1825 |
| 2020/0366449 A1* | 11/2020 | Li ................ | H04L 1/0073 |
| 2022/0052820 A1* | 2/2022 | Ling ................ | H04L 1/1887 |

FOREIGN PATENT DOCUMENTS

| | | |
|---|---|---|
| CN | 101809885 A | 8/2010 |
| CN | 102474387 A | 5/2012 |
| CN | 102739378 A | 10/2012 |
| CN | 102752092 A | 10/2012 |
| CN | 103036645 A | 4/2013 |
| CN | 104254995 A | 12/2014 |
| CN | 108702772 A | 10/2018 |
| EP | 2629442 A1 | 8/2013 |
| WO | 2006095056 A1 | 9/2006 |
| WO | 2010149107 A1 | 12/2010 |
| WO | 2013135022 A1 | 9/2013 |

OTHER PUBLICATIONS

Mousavi, H et al., "LTE physical layer: Performance analysis and evaluation", Applied Computing and Informatics, vol. 15, Issue 1, Sep. 19, 2017, pp. 34-44.

Xiaowen, L. et al., "DSP realization of Turbo code rate matching in TD-LTE system", Application of Integrated Circuits, Issue 5, 2012, with an English Abstract, pp. 52-55.

Huawei et al., "Enhancements on multi-TRP/panel transmission", 3GPP TSG RAN WG1 Meeting #95, R1-1812243, Spokane, WA, US, Nov. 12-16, 2018, 9 pages.

* cited by examiner

ADAPTIVE TRANSMISSION METHOD FOR SATELLITE COMMUNICATION, APPARATUS, AND SYSTEM

CROSS-REFERENCE TO RELATED APPLICATIONS

This application is a continuation of International Application No. PCT/CN2020/073911, filed on Jan. 22, 2020, which claims priority to Chinese Patent Application No. 201910083857.7, filed on Jan. 29, 2019. The disclosures of the aforementioned applications are hereby incorporated by reference in their entireties.

TECHNICAL FIELD

This application relates to the field of satellite communication, and in particular, to an adaptive transmission method for satellite communication, an apparatus, and a system.

BACKGROUND 5G and 5G evolution networks need to meet service requirements of various industries and provide wider service coverage. Limited coverage capability of a current terrestrial mobile communication network cannot meet requirements of the people for obtaining information at any time and any place. In addition, providing ultra-wide coverage in a current base-station-based coverage mode poses great challenges in costs and feasibility in scenarios such as in a remote area, a desert, an ocean, and in the air. Compared with a conventional mobile communication system, satellite communication has a wider coverage and supports asymmetric transmission links. The communication costs are irrelevant to the transmission distance. The satellite communication can overcome natural geographical obstacles such as oceans, deserts, and mountains. In order to overcome the shortcomings of a conventional terrestrial mobile communication system, the satellite communication can be used as an effective supplement to the conventional communication system.

In the terrestrial mobile communication system, errors occur in data transmission due to a random characteristic of a wireless channel. A hybrid automatic repeat request (HARQ) technology is usually used to control the errors. The hybrid automatic repeat request is a technology that combines forward error correction (FEC) and automatic repeat request (ARQ). It has been widely used in 3G and 4G terrestrial mobile communication systems.

In the conventional technology, a transmit end performs channel coding on to-be-transmitted data and then sends the data to a receive end, and the receive end decodes a received data packet and determines whether the data packet is correctly received. If the data packet is correctly received, a new data packet is requested; or if the data packet is incorrectly received, a retransmission is requested, and the transmit end selects a different redundancy version (RV) for transmission. Although a hierarchical gain can be obtained through a HARQ retransmission, in the HARQ, the transmit end needs to wait for an ACK/NACK feedback from the receive end, and needs to retransmit the data packet when receiving the NACK feedback. Consequently, a transmission delay is caused. For a satellite communication system, because a satellite is far away from the ground, a transmission delay between a satellite base station and a terrestrial user is relatively large compared with that of a terrestrial cellular system, and satellite coverage is much larger than that of a terrestrial base station. Considering integration of a satellite communication system and a 5G terrestrial mobile communication system, a relatively large transmission delay may be introduced by using an existing HARQ technology in the satellite communication system. Due to the relatively large transmission delay, the following problems may be caused: (1). Service quality is affected, especially for real-time services such as a video service or services that require low delay. (2). A size of a buffer of receiver is affected.

SUMMARY

This application provides an adaptive transmission method for satellite communication, in which a HARQ retransmission is not required. A receive end feeds back a redundancy version index, where one redundancy version index corresponds to different redundancy version combinations; and a transmit end performs transmission in different diversity modes based on a redundancy version combination corresponding to the redundancy version index that is fed back by the receive end, to obtain a diversity transmission gain, thereby improving transmission reliability and reducing a transmission delay.

According to a first aspect, an adaptive transmission method for satellite communication is provided. The method includes: A receive end determines a redundancy version index; and the receive end feeds back the redundancy version index to a transmit end.

In a first possible implementation of the first aspect, the receive end determines a redundancy version based on channel quality, and then determines the redundancy version index based on a correspondence between a redundancy version index and a redundancy version combination. Optionally, the receive end determines a redundancy version based on a signal-to-noise ratio and bit error rate curve, and then determines the redundancy version index based on a correspondence between a redundancy version index and a redundancy version combination.

With reference to the first aspect or the first possible implementation of the first aspect, in a second possible implementation of the first aspect, the receive end feeds back the redundancy version index to the transmit end through an uplink control channel, and the method includes: the receive end performs channel coding on the redundancy version index, to obtain a bit sequence obtained after the channel coding; the receive end performs quadrature phase shift keying modulation on the bit sequence obtained after the channel coding, to obtain a complex symbol sequence; and the receive end maps the complex symbol sequence to a transmission resource of the uplink control channel for transmission, and finally transmits the complex symbol sequence to the transmit end.

With reference to the first aspect or the foregoing possible implementations of the first aspect, in a third possible implementation of the first aspect, the receive end feeds back the redundancy version index to the transmit end through an uplink data channel, and the method includes: the receive end performs the channel coding on the redundancy version index, to obtain the bit sequence obtained after the channel coding on the redundancy version index; the receive end performs channel coding on uplink transmission data, to obtain a bit sequence obtained after the channel coding on the uplink transmission data; the receive end multiplexes the bit sequence obtained after the channel coding on the redundancy version index and the bit sequence obtained after the channel coding on the uplink transmission data; and the receive end interleaves and modulates the multiplexed bit sequence, maps the multiplexed bit sequence to a transmission resource of the uplink data channel for transmission, and finally transmits the multiplexed bit sequence to the transmit end.

With reference to the second possible implementation of the first aspect or the third possible implementation of the first aspect, in a fourth possible implementation of the first aspect, a scheme in which the receive end performs the channel coding on the redundancy version index includes a convolutional code, a polar code, or RM coding; and a scheme in which the receive end performs the channel coding on the uplink transmission data includes a convolutional code, a polar code, a turbo code, or an LDPC code.

With reference to the third or the fourth possible implementation of the first aspect, in a fifth possible implementation of the first aspect, a manner in which the receive end multiplexes the bit sequence obtained after the channel coding on the redundancy version index and the bit sequence obtained after the channel coding on the uplink transmission data includes: The receive end directly attaches the bit sequence obtained after the channel coding on the redundancy version index to the bit sequence obtained after the channel coding on the uplink transmission data; or the receive end directly inserts the bit sequence obtained after the channel coding on the redundancy version index into the bit sequence obtained after the channel coding on the uplink transmission data; or the receive end alternately interleaves, in a per-bit sequence, the bit sequence obtained after the channel coding on the redundancy version index and the bit sequence obtained after the channel coding on the uplink transmission data.

According to a second aspect, an adaptive transmission method for satellite communication is provided. The method includes: A transmit end receives a redundancy version index signal fed back by a receive end, and performs operations such as demodulation and decoding on the redundancy version index signal to obtain a redundancy version index; the transmit end obtains a corresponding redundancy version combination based on the obtained redundancy version index and a correspondence between a redundancy version index and a redundancy version combination; and the transmit end selects a proper diversity mode for transmission based on the obtained redundancy version combination.

In a first possible implementation of the second aspect, a method in which the transmit end selects a proper diversity mode for transmission based on the obtained redundancy version combination includes: transmitting redundancy versions in the redundancy version combination on continuous resource blocks; and demodulating, by the receive end, different redundancy versions on the continuous resource blocks, and combining the redundancy versions to obtain a diversity gain. Optionally, redundancy versions in the redundancy version combination are transmitted on discontinuous resource blocks, and there is a mapping relationship or a function relationship between resource locations of the discontinuous resource blocks. The mapping relationship or the function relationship is known to the transmit end and the receive end, and the receive end demodulates, based on the resource positions of the discontinuous resource blocks, different redundancy versions on corresponding resource blocks, and combines the redundancy versions to obtain a diversity gain.

According to a third aspect, an adaptive transmission method for transmitting a redundancy version based on a signal-to-noise ratio is provided. The method includes: A satellite sends a data packet at a fixed rate $R=B \log_2(1+\gamma)$ at an initial moment $t_0$, where the rate corresponds to a signal-to-noise ratio $\gamma$; the satellite receives, through terrestrial user measurement, a signal-to-noise ratio $SNR_0$ fed back by a user at a moment $t_1$; and the satellite SNR t compares the signal-to-noise ratio $SNR_0$ received at the moment $t_1$ with the signal-to-noise ratio V used during sending at the moment $t_0$. If $SNR_0 > \gamma$, a transmission process at the moment $t_0$ is repeated at the moment $t_1$; or if $SNR_0 < \gamma$, data with an RV0 version that is sent at the corresponding moment $t_0$ and some new data are sent at the moment $t_1$, and it is ensured that a transmission rate is still R. If $SNR_0 < \gamma$, satellite receives, through terrestrial user measurement, a signal-to-noise ratio $SNR_1$ fed back by a user at a moment $t_2$; and the satellite compares the signal-to-noise ratio $SNR_1$ received at the moment $t_2$ with the signal-to-noise ratio $\gamma$ used during sending at the moment $t_1$. If $SNR_1 > \gamma$, the satellite repeats, at the moment $t_2$, the transmission process at the moment $t_0$; or if $SNR_1 < \gamma$, data with an RV1 version that is sent at the corresponding moment $t_1$ and some new data are still sent at the moment $t_2$, and it is ensured that a transmission rate is still R. The rest may be deduced by analogy according to the foregoing steps, and until $SNR_x > \gamma$ (where x is an integer, and $x \geq 1$), it indicates that all previously sent data is normally received, and the satellite starts to repeat the transmission process at the moment $t_0$.

According to a fourth aspect, a user terminal is provided, including a determining module and a sending module.

The determining module is configured to determine a redundancy version index; and the sending module is configured to feed back the redundancy version index to a satellite base station.

In a first possible implementation of the fourth aspect, the user terminal performs an operation at a receive end, and the user terminal further includes an encoding module. The encoding module is configured to perform channel coding on the redundancy version index, to obtain a bit sequence obtained after the channel coding.

With reference to the fourth aspect or the first possible implementation of the fourth aspect, in a second possible implementation of the fourth aspect, the user terminal performs an operation at a receive end, and the user terminal further includes a modulation module and a mapping module. The modulation module is configured to perform quadrature phase shift keying (QPSK) modulation on the bit sequence obtained after the channel coding on the redundancy version index, to obtain a complex symbol sequence; and the mapping module is configured to: map the complex symbol sequence to a transmission resource of an uplink control channel for transmission, and finally transmit the complex symbol sequence to the satellite base station.

With reference to the fourth aspect, in a third possible implementation of the fourth aspect, the user terminal performs an operation at a receive end, and the user terminal further includes an encoding module. The encoding module is configured to perform channel coding on the redundancy version index, to obtain a bit sequence obtained after the channel coding; and the encoding module is further configured to perform channel coding on uplink transmission data, to obtain a bit sequence obtained after the channel coding on the uplink transmission data.

With reference to the fourth aspect or the third possible implementation of the fourth aspect, in a fourth possible implementation of the fourth aspect, the user terminal performs an operation at a receive end, and the user terminal further includes a multiplexing module, a modulation module and a mapping module. The multiplexing module is configured to multiplex the bit sequence obtained after the channel coding on the redundancy version index and the bit sequence obtained after the channel coding on the uplink transmission data, to obtain a multiplexed bit sequence; the modulation module is configured to perform quadrature phase shift keying (QPSK) modulation on the bit sequence multiplexed by the bit sequence obtained after the channel coding on the redundancy version index and the bit sequence obtained after the channel coding on the uplink transmission data, to obtain a complex symbol sequence; and the mapping module is further configured to map the complex symbol sequence to a transmission resource of an uplink data channel for transmission, and finally transmit the complex symbol sequence to the satellite base station.

According to a fifth aspect, a user terminal is provided, including a processor and a memory. The processor is connected to the memory; and the memory is configured to store a computer program instruction, where when the user terminal runs, the processor executes the computer program instruction stored in the memory, so that the user terminal performs any one of the adaptive transmission methods for satellite communication.

According to a sixth aspect, a satellite base station is provided, including a receiving module, an obtaining module, and a diversity module. The receiving module is configured to receive a redundancy version index signal fed back by a user terminal; the obtaining module is configured to obtain a corresponding redundancy version combination based on an obtained redundancy version index and a correspondence between a redundancy version index and a redundancy version combination; and the diversity module is configured to select a proper diversity mode for transmission based on the obtained redundancy version combination.

In a first possible implementation of the sixth aspect, the satellite base station further includes: a demodulation module, a decoding module, and a communications module. The demodulation module is configured to demodulate the received redundancy version index signal; the decoding module is configured to decode the demodulated redundancy version index signal; and the communications module is configured to implement service communication between the satellite base station and the user terminal.

According to a seventh aspect, a satellite base station is provided, including a processor and a memory. The processor is connected to the memory; and the memory is configured to store a computer program instruction, where when the satellite base station runs, the processor executes the computer program instruction stored in the memory, so that the satellite base station performs any one of the adaptive transmission methods for satellite communication.

According to an eighth aspect, a computer-readable storage medium is provided. The computer-readable storage medium stores an instruction, and when the instruction is run on a computer, the computer is enabled to perform the adaptive transmission method for satellite communication according to any one of the first aspect, the possible implementations of the first aspect, the second aspect, the possible implementations of the second aspect, and the third aspect.

According to a ninth aspect, a computer program product including an instruction is provided. When the computer program product runs on a computer, the computer is enabled to perform the adaptive transmission method for satellite communication according to any one of the first aspect, the possible implementations of the first aspect, the second aspect, the possible implementations of the second aspect, and the third aspect.

According to a tenth aspect, a satellite communication system is provided. The satellite communication system includes: the user terminal according to any one of the fourth aspect and the possible implementations of the fourth aspect of this application, and the satellite base station according to any one of the sixth aspect and the possible implementations of the sixth aspect of this application. Alternatively, the satellite communication system includes: the user terminal according to any one of the fifth aspect and the possible implementations of the fifth aspect of this application, and the satellite base station according to any one of the seventh aspect and the possible implementations of the seventh aspect of this application.

DETAILED DESCRIPTION OF ILLUSTRATIVE EMBODIMENTS

The following clearly describes the technical solutions of this application in detail with reference to the accompanying drawings.

Figure 1:
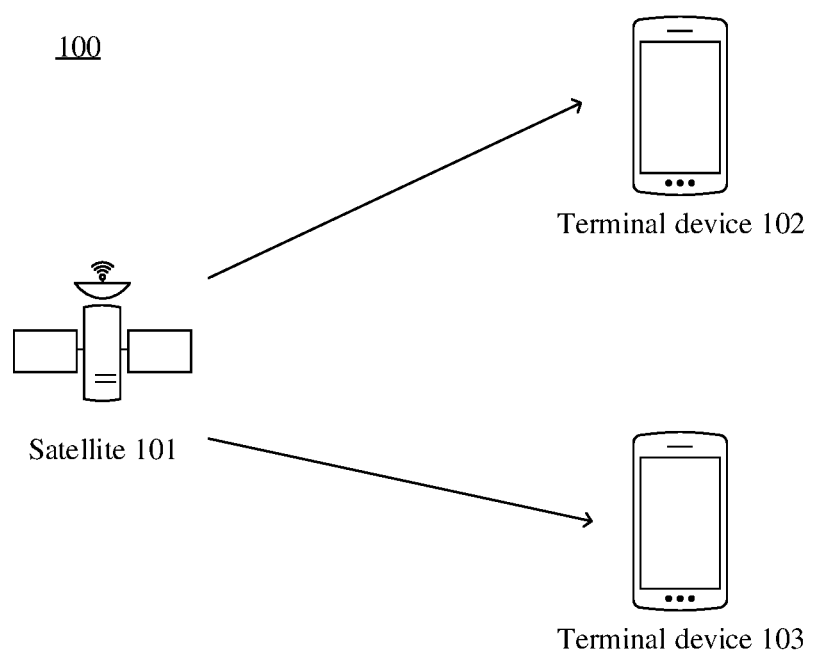
FIG. 1 shows a wireless communication system too applicable to this application.

FIG. 1 shows a satellite communication system 100 applicable to this application. The satellite communication system 100 includes a satellite base station 101 and terminal-type network elements 102 and 103. The satellite base station 101 provides a communications service for the terminal devices 102 and 103. The terminal devices 102 and 103 may be devices such as smartphones, smart watches, and tablet computers. The satellite base station transmits downlink data to the terminal device, where the downlink data is encoded in a channel encoding scheme, and the encoded data is transmitted to the terminal device after constellation modulation. The terminal device transmits uplink data to the satellite base station, where the uplink data may also be encoded in a channel encoding scheme, and the encoded data is transmitted to the satellite base station after constellation modulation.

The satellite base station and the terminal device in FIG. 1 communicate with each other by using a wireless technology. When the satellite base station sends a signal, the satellite base station is a transmit end, and when the satellite base station receives a signal, the satellite base station is a receive end. On the contrary, when the terminal device sends a signal, the terminal device is a transmit end, and when the terminal device receives a signal, the terminal device is a receive end.

A hybrid automatic repeat request (HARQ) is a technology that combines forward error correction (FEC) and automatic repeat request (ARQ). Forward error correction (FEC) enables a receive end to correct some errors by adding redundant information, thereby reducing a quantity of retransmissions. For an error that cannot be corrected by using forward error correction (FEC), the receive end requests, by using an automatic repeat request (ARQ) mechanism, a transmit end to retransmit data. The receive end uses an error detection code, which is usually a CRC check, to detect whether an error occurs in a received data packet. If there is no error, a positive acknowledgment (ACK) is sent. If an error occurs, the receive end discards the data packet, and sends a negative acknowledgment (NACK) to the transmit end; and after receiving the NACK, the transmit end retransmits same data. In the automatic repeat request (ARQ) mechanism described above, data packets are discarded and a retransmission is requested. However, although the data packets cannot be correctly decoded, useful information is still included in the data packets. If the data packets are discarded, the useful information is lost. By using the HARQ technology and a chase combine technology, a received erroneous data packet is stored in a HARQ buffer, and is combined with a retransmitted data packet that is subsequently received, to obtain a more reliable data packet than a data packet that is obtained through separate decoding. Then, the combined data packet is decoded. If decoding still fails, a retransmission is requested again, and chase combine is performed again.

According to whether retransmitted bit information is the same as that in an original transmission, the hybrid automatic repeat request (HARQ) technology is classified into chase combine (CC) and incremental redundancy (IR). The retransmitted bit information in chase combine (CC) is the same as that in the original transmission. The retransmitted bit information in the incremental redundancy does not need to be the same as that in the original transmission. Herein only incremental redundancy is described because the mechanism is used in LTE and 5G NR. In incremental redundancy, each retransmission does not need to be the same as an initial transmission. On the contrary, a plurality of coded bit sets are generated, and each set carries same information. Each time a retransmission is required, a different coded bit set from a previous coded bit set is usually transmitted, and the receive end combines retransmitted data with the previously transmitted data. A coded bit set in each retransmission is referred to as a redundancy version (RV). Because an additional parity bit that is not included in a previous transmission may be carried in the retransmission, a bit rate of the retransmission is reduced. Coded bits whose quantity is different from the quantity of initially transmitted coded bits may be included in each retransmission, and modulation schemes for different retransmissions may also be different.

After channel coding is performed on an information bit sequence, a systematic bit sequence, a first parity bit sequence, and a second parity bit sequence are output. The output bit sequences are interleaved and then inserted into a circular buffer. The systematic bit sequence is first inserted, and then the first parity bit sequence and the second parity bit sequence are alternately inserted.

That redundancy versions RVs are different means that bits to be sent are extracted from different starting positions of the circular buffer. For example, turbo coding is used for channel coding on a DL-SCH and a UL-SCH. Systematic bits in the turbo coding are more important than parity bits, and at least all systematic bits and some parity bits need to be included in an initial transmission. However, in a retransmission, parity bits that are not included in the initial transmission are included. If quality of the received bits in the initial transmission (that is, the first transmission) is very poor or the bits are not received at all in the initial transmission, performance of the retransmission of the redundancy version RV carrying only the parity bit (parity bit) is not as good as that of the retransmission of the redundancy version RV including all (or some) systematic bits. In this case, there are two different negative acknowledgments: a NACK and a DTX. The NACK requires a retransmission of additional parity bits, while the DTX requires a retransmission of the systematic bits. In conclusion, it is important to determine, based on signal quality in a previous transmission attempt, how many systematic bits and parity bits are included in the retransmission.

In a HARQ protocol, a same HARQ process is classified into synchronous and asynchronous in time domain, and is classified into adaptive and non-adaptive in frequency domain.

The asynchronous HARQ means that a retransmission can occur at any time and that a HARQ process can be used in any order. The synchronous HARQ means that a retransmission can be performed only at a fixed moment after a previous transmission, and also means that only a specific HARQ process can be used for a specific subframe. The adaptive HARQ (synchronous HARQ) means that a physical resource block (PRB) resource and a modulation and coding scheme (MCS) used for a retransmission can be changed. The non-adaptive HARQ means that a physical resource block (PRB) resource and a modulation and coding scheme (MCS) that are used in a retransmission need to be the same as those in a previous transmission (a new transmission or a previous retransmission). In LTE and 5G NR, the asynchronous HARQ and the adaptive HARQ are used in downlink; the synchronous HARQ is used in uplink, but a retransmission can be adaptive or non-adaptive. It should be noted that, the asynchronous or synchronous HARQ, and the adaptive or non-adaptive HARQ are used for a relationship between the previous transmission (including the new transmission and the previous retransmission) and the retransmission, and are not used for a relationship between a physical uplink shared channel (PUSCH) transmission (including a new transmission and a retransmission) and an ACK/NACK.

Figure 2:
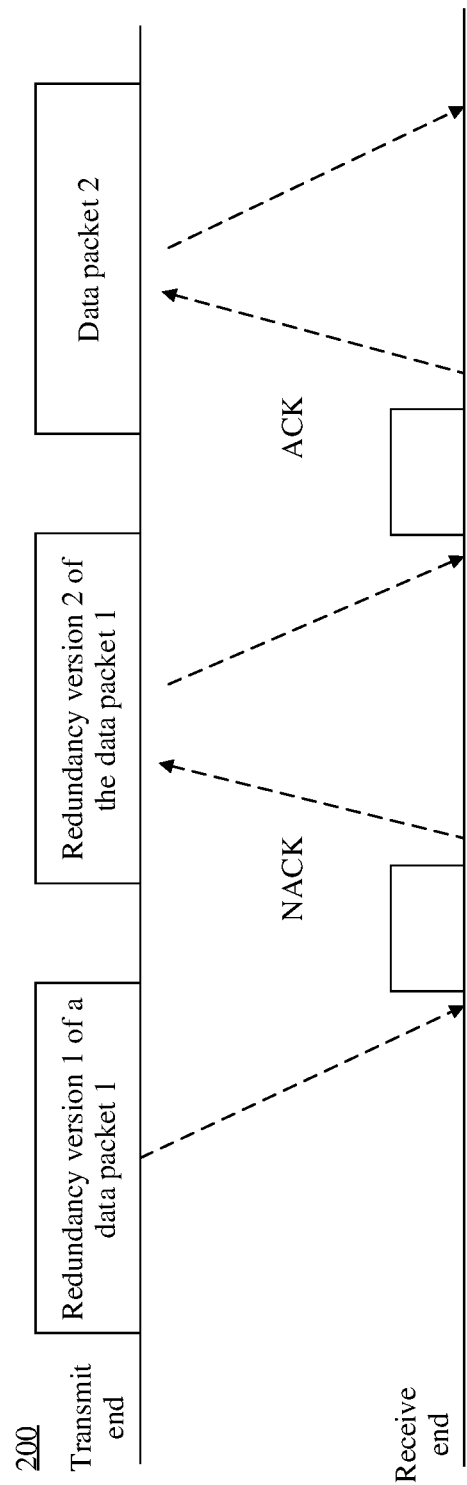
FIG. 2 is a data transmission process using a hybrid automatic repeat request HARQ technology.

FIG. 2 is a data transmission process using a hybrid automatic repeat request HARQ technology. As shown in FIG. 2, a transmit end sends a redundancy version 1 of a data packet 1, and a receive end receives and decodes the redundancy version 1 of the data packet 1, to determine whether decoding is correct. If the decoding is incorrect, the receive end feeds back a NACK to the transmit end. After receiving the NACK, the transmit end learns that the receive end does not correctly receive the data packet 1, and the transmit end selects a redundancy version 2 of the data packet 1 for retransmission. The receive end receives and decodes the redundancy version 2 of the data packet 1, and determines whether decoding is correct. If the decoding performed by the receive end is correct, the receive end feeds back an ACK to the transmit end. After receiving the ACK sent by the receive end, the transmit end confirms that the receive end has correctly received the data packet 1, and then the transmit end selects a new data packet 2 for transmission.

Figure 3:
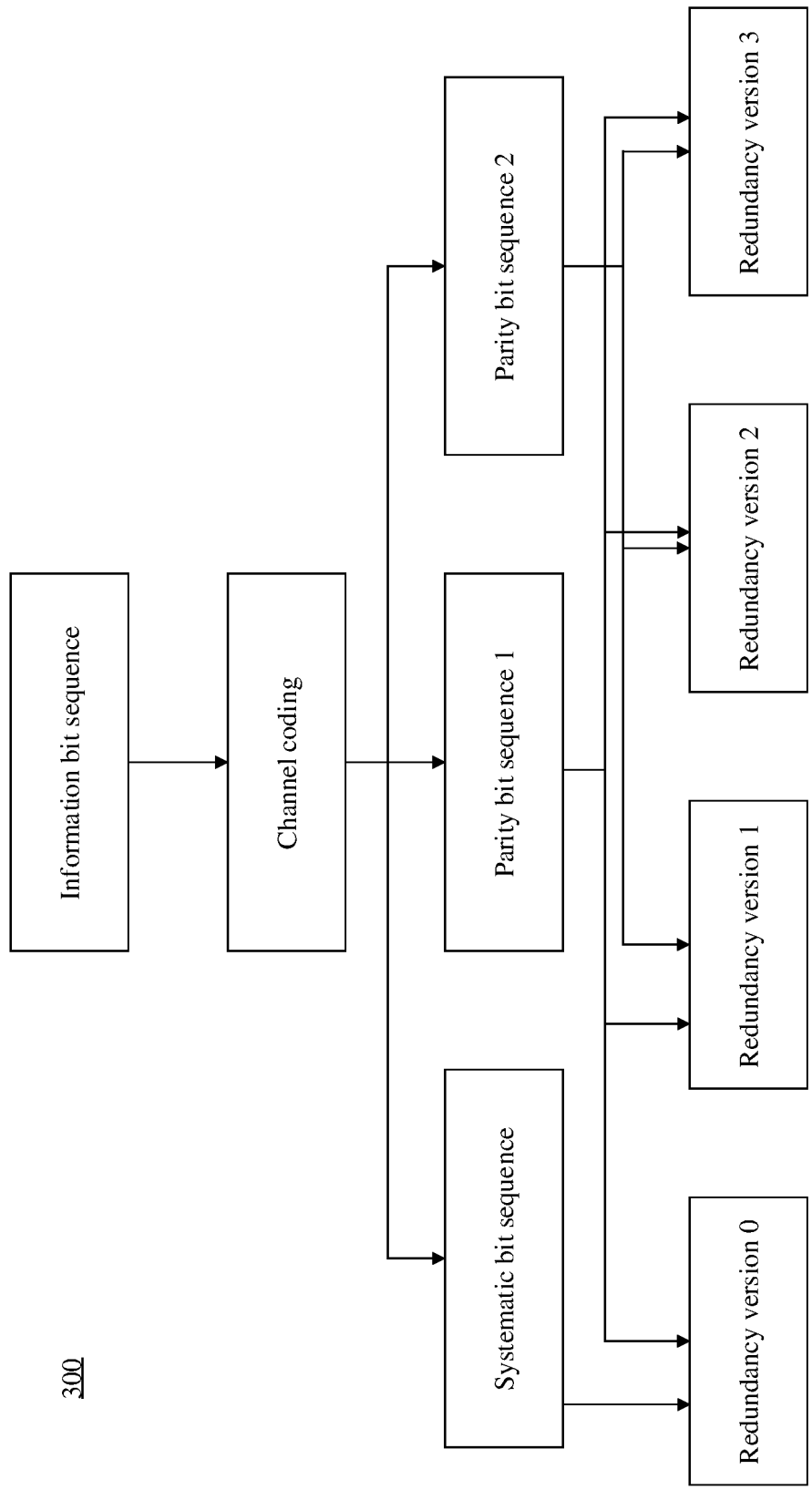
FIG. 3 is a process of generating a redundancy version of a data packet.

FIG. 3 is a process of generating a redundancy version of a data packet. As shown in FIG. 3, channel coding is first performed on an information bit sequence. Optionally, a channel coding scheme may be a turbo code, an LDPC code, or another effective channel coding scheme in the conventional technology. This is not limited in this application. After the channel coding is performed on the information bit sequence, a systematic bit sequence and a parity bit sequence are obtained. Without loss of generality, that the parity bit sequence includes two types of sequences: a parity bit sequence 1 and a parity bit sequence 2 in FIG. 3 is used as an example. A plurality of redundancy versions may be obtained by combining the systematic bit sequence and the parity bit sequence in a specific manner. Optionally, a combination manner of the systematic bit sequence and the parity bit sequence may be a combination of all bits in the systematic bit sequence and some bits in the parity bit sequence. Optionally, a combination manner of the systematic bit sequence and the parity bit sequence may alternatively be a combination of all bits in the systematic bit sequence and all bits in the parity bit sequence. Different redundancy versions RVs are used in each HARQ retransmission, and there are a maximum of eight different redundancy versions. Herein, each redundancy version corresponds to a different coded bit subset, where each subset includes different bits. For example, in FIG. 3, after all bits in the systematic bit sequence and/or all or some bits in the parity bit sequence 1 and/or the parity bit sequence 2 are combined in a specific manner, four redundancy versions: an RV0, an RV1, an RV2, and an RV3 are obtained. The redundancy version RV0 includes all bits in the systematic bit sequence and all or some bits in the parity bit sequence 1, the redundancy version RV1 includes all or some bits in the parity bit sequence 1 and all or some bits in the parity bit sequence 2; the redundancy version RV2 includes all or some bits in the parity bit sequence 1 and all or some bits in the parity bit sequence 2; and the redundancy version RV3 includes all or some bits in the parity bit sequence 1 and all or some bits in the parity bit sequence 2.

It can be learned from the foregoing descriptions that it is important to determine, based on signal quality in a previous transmission attempt, how many systematic bits and parity bits are included in the retransmission. In this application, the receive end may determine a redundancy version based on channel quality or a signal-to-noise ratio and bit error rate curve, and then determine a redundancy version index based on a correspondence between a redundancy version index and a redundancy version combination. Different redundancy version indexes may correspond to different redundancy version combinations. Table 1 shows a correspondence between a redundancy version (RV) index and a redundancy version combination according to this application. Four redundancy versions in FIG. 2 are used below as examples for description. The correspondence is used in the adaptive transmission method for satellite communication provided in this application.

TABLE 1

| Redundancy version index | Corresponding redundancy version combination |
|---|---|
| 0 | $RV_0$ |
| 1 | $RV_0 + RV_1$ |

TABLE 1-continued

| Redundancy version index | Corresponding redundancy version combination |
|---|---|
| 2 | $RV_0 + RV_1 + RV_2$ |
| 3 | $RV_0 + RV_1 + RV_2 + RV_3$ |

In Table 1, the redundancy version (RV) index may be represented by a regular integer sequence, for example, 0, 1, 2, and 3. Optionally, the redundancy version index may also be represented by a regular binary sequence, for example, 00, 01, 10, and 11. Optionally, the redundancy version index may alternatively be represented in another effective manner. This is not limited in this application. For example, the redundancy version indexes described in Table 1 correspond to four redundancy version combinations, where the redundancy version index value 0 corresponds to the redundancy version RV0, the redundancy version index value 1 corresponds to a combination of the redundancy versions RV0 and RV1; the redundancy version index value 2 corresponds to a combination of the redundancy versions RV0, RV1, and RV2; and the redundancy version index value 3 corresponds to a combination of the redundancy versions RV0, RV1, RV2, and RV3.

In addition to the correspondence between a redundancy version index and a redundancy version combination described in Table 1, four redundancy versions in FIG. 2 are used as examples, and more redundancy version index values may be further used to represent more types of redundancy version combinations. As shown in Table 2, seven redundancy version index values may be used to represent seven different redundancy version combinations. In Table 1, each of the redundancy version combinations corresponding to the redundancy version index value 0 to the index value 3 is obtained by adding another redundancy version on the basis of the redundancy version combination corresponding to a previous redundancy version index value. In Table 2, a redundancy version index value 0 corresponds to a redundancy version RV0, redundancy version index values 1, 2, and 3 each correspond to a combination of two redundancy versions; redundancy version index values 4, 5, and 6 each correspond to a combination of three redundancy versions; and a redundancy version index value 7 corresponds to a combination of four redundancy versions. Optionally, the redundancy version index values may also be represented by using three binary bits or in another effective representation manner. The Table 1 and Table 2 are merely examples, and are intended to describe the correspondence between a redundancy version index and a redundancy version combination. This application is not limited to the correspondences shown in Table 1 and Table 2.

TABLE 2

| RV index (RV index) | Corresponding redundancy version RV |
|---|---|
| 0 | $RV_0$ |
| 1 | $RV_0 + RV_1$ |
| 2 | $RV_0 + RV_2$ |
| 3 | $RV_0 + RV_3$ |
| 4 | $RV_0 + RV_1 + RV_2$ |
| 5 | $RV_0 + RV_1 + RV_3$ |
| 6 | $RV_0 + RV_2 + RV_3$ |
| 7 | $RV_0 + RV_1 + RV_2 + RV_3$ |

This application includes but is not limited to the correspondences between a redundancy version index and a redundancy version combination described in Table 1 and Table 2. Optionally, more redundancy version index values may be used to represent more types of redundancy version combinations. The correspondence between a redundancy version index and a redundancy version combination may be defined based on a requirement. However, generally, at least all systematic bits and some parity bits need to be included in an initial transmission (that is, the first transmission) process. Therefore, the foregoing correspondence between a redundancy version index and a redundancy version combination needs to meet at least the following condition: A redundancy version corresponding to at least one redundancy version index value includes all bits in a systematic bit sequence. For example, the redundancy version combinations corresponding to the redundancy version indexes in Table 1 and Table 2 each include the redundancy version RV0 that includes all systematic bits.

Figure 4:
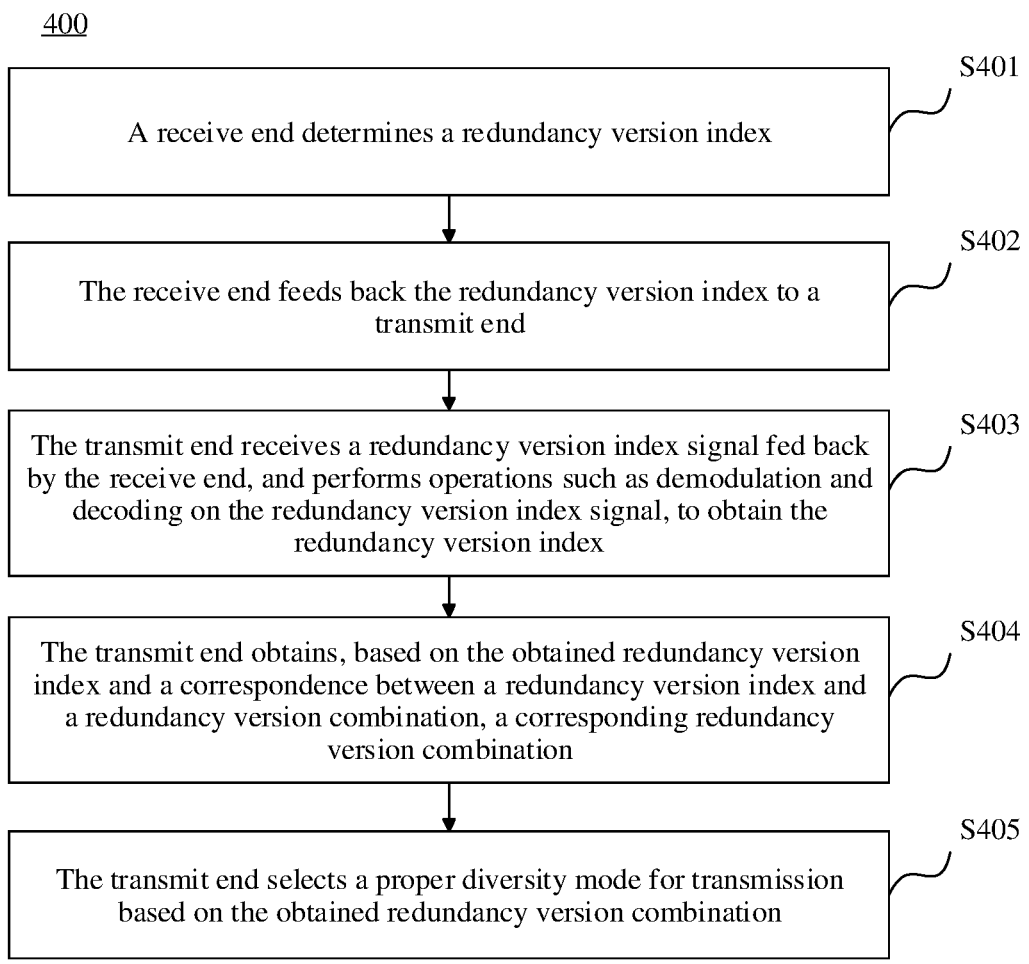
FIG. 4 is a schematic flowchart of an adaptive transmission method 400 for satellite communication according to this application.

FIG. 4 is a schematic flowchart of an adaptive transmission method 400 for satellite communication according to this application. As shown in FIG. 4, a receive end mainly performs the following processing procedure.

401. The receive end determines a redundancy version index. One redundancy version index may include a plurality of redundancy version index values, and different redundancy version index values correspond to different redundancy version combinations.

A plurality of redundancy versions may be obtained by combining a systematic bit sequence and a parity bit sequence in a specific manner. Optionally, the plurality of redundancy versions may be a combination of all systematic bits and all or some parity bits. Optionally, the plurality of redundancy versions may alternatively be a combination of all or some bits in first parity bits and all or some bits in second parity bits.

The receive end may determine a redundancy version based on channel quality, and then determines the redundancy version index based on a correspondence between a redundancy version combination and a redundancy version index. Optionally, the receive end may alternatively determine a redundancy version based on a signal-to-noise ratio and bit error rate curve, and then determines the redundancy version index based on a correspondence between a redundancy version combination and a redundancy version index.

The redundancy version index may be represented by a regular integer sequence, for example, 0, 1, 2, 3, and so on.

Optionally, the redundancy version index may also be represented by a regular binary sequence, for example, 00, 01, 10, 11, and so on.

Optionally, the redundancy version index may alternatively be represented in another effective manner. This is not limited in this application.

A correspondence between a redundancy version index value and a redundancy version combination may be defined based on a requirement, but at least the following condition needs to be met: A redundancy version combination corresponding to at least one redundancy version index value includes all bits in a systematic bit sequence.

402. The receive end feeds back the redundancy version index to a transmit end.

Optionally, the receive end may feed back the redundancy version index to the transmit end through an uplink control channel or an uplink data channel.

Figure 5:
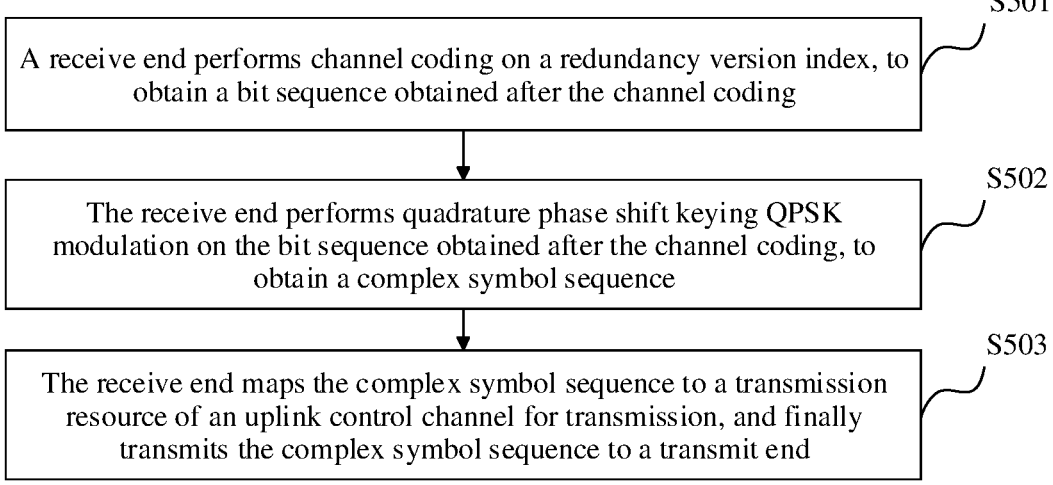
FIG. 5 is a schematic flowchart of a method 500 according to Embodiment 1 of this application.

In an embodiment provided in this application, the receive end feeds back the redundancy version index to the transmit end through the uplink control channel. FIG. 5 is a schematic flowchart of the method 500 according to this embodiment. A specific procedure is as follows.

501. The receive end performs channel coding on the redundancy version index, to obtain a bit sequence obtained after the channel coding.

Optionally, the channel coding scheme may be a convolutional code, a polar code, RM coding, or another effective coding scheme in the conventional technology. This is not limited in this application.

502. The receive end performs quadrature phase shift keying (quadrature phase shift keying, QPSK) modulation on the bit sequence obtained after the channel coding, to obtain a complex symbol sequence.

503. The receive end maps the complex symbol sequence to a transmission resource of the uplink control channel for transmission, and finally transmits the complex symbol sequence to the transmit end.

Figure 6:
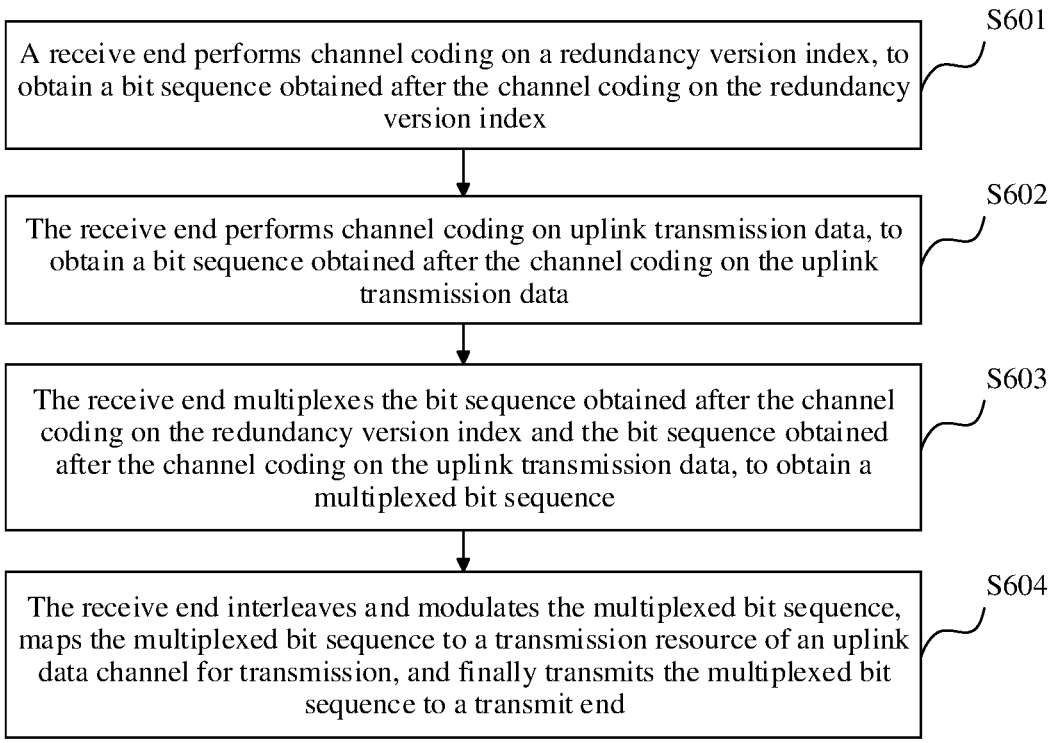
FIG. 6 is a schematic flowchart of a method 600 according to Embodiment 2 of this application.

In another embodiment provided in this application, the receive end feeds back the redundancy version index to the transmit end through the uplink data channel. FIG. 6 is a schematic flowchart of the method 600 according to this embodiment. A specific procedure is as follows.

601. The receive end performs channel coding on the redundancy version index, to obtain a bit sequence obtained after the channel coding on the redundancy version index.

Optionally, the channel coding scheme may be a convolutional code, a polar code, RM coding, or another effective coding scheme in the conventional technology. This is not limited in this application.

602. The receive end performs channel coding on uplink transmission data, to obtain a bit sequence obtained after the channel coding on the uplink transmission data.

Optionally, the channel coding scheme may be a convolutional code, a polar code, a turbo code, a low-density parity-check (LDPC) code, or another effective coding scheme in the conventional technology. This is not limited in this application.

603. The receive end multiplexes the bit sequence obtained after the channel coding on the redundancy version index and the bit sequence obtained after the channel coding on the uplink transmission data, to obtain a multiplexed bit sequence.

Optionally, the multiplexing manner includes: directly attaching the bit sequence obtained after the channel coding on the redundancy version index to the bit sequence obtained after the channel coding on the uplink transmission data.

Optionally, the multiplexing manner further includes: directly inserting the bit sequence obtained after the channel coding on the redundancy version index into the bit sequence obtained after the channel coding on the uplink transmission data.

Optionally, the multiplexing manner further includes: alternately interleaving, in a per-bit sequence, the bit sequence obtained after the channel coding on the redundancy version index and the bit sequence obtained after the channel coding on the uplink transmission data.

Optionally, the multiplexing manner further includes: multiplexing the bit sequence obtained after the channel coding on the redundancy version index and the bit sequence obtained after the channel coding on the uplink transmission data in another effective manner in the conventional technology. This is not limited in this application.

604. The receive end interleaves and modulates the multiplexed bit sequence, maps the multiplexed bit sequence to a transmission resource of the uplink data channel for transmission, and finally transmits the multiplexed bit sequence to the transmit end.

Correspondingly, operations performed by the transmit end in the adaptive transmission method 400 for satellite communication provided in this application mainly include the following procedure.

403. The transmit end receives a redundancy version index signal fed back by the receive end, and performs operations such as demodulation and decoding on the redundancy version index signal, to obtain the redundancy version index.

404. The transmit end obtains, based on the obtained redundancy version index and the correspondence between a redundancy version index and a redundancy version combination, a corresponding redundancy version combination.

The correspondence between a redundancy version index and a redundancy version combination may be that shown in the foregoing Table 1 or Table 2, but is not limited to the correspondence shown in Table 1 or Table 2. As shown in Table 1, there are four redundancy version index values. If an obtained redundancy version index value is 2, the corresponding redundancy version combinations are RV0, RV1, and RV2. As shown in Table 2, there are seven redundancy version index values. If an obtained redundancy version index value is 2, the corresponding redundancy version combinations are RV0 and RV2.

405. The transmit end selects a proper diversity mode for transmission based on the obtained redundancy version combination.

Redundancy versions in the redundancy version combination may be transmitted on continuous resource blocks or discontinuous resource blocks.

In a possible implementation, the redundancy versions in the redundancy version combination are transmitted on continuous resource blocks (RBs).

For example, for the redundancy version index value 2 in Table 1, the corresponding redundancy version combinations are RV0, RV1, and RV2. The redundancy version RV0 is transmitted on a resource block $RB_x$, the redundancy version RV1 is transmitted on a resource block $RB_{x+1}$, and the redundancy version RV2 is transmitted on a resource block $RB_{x+2}$. The receive end demodulates different redundancy versions on continuous resource blocks, and performs combination to obtain a diversity gain.

In a possible implementation of this application, redundancy versions in the redundancy version combination are transmitted on discontinuous resource blocks.

Still, for example, for the redundancy version index 2 in Table 1, the corresponding redundancy version combinations are RV0, RV1, and RV2. The redundancy version RV0 is transmitted on a resource block $RB_x$, the redundancy version RV1 is transmitted on a resource block $RB_y$, and the redundancy version RV2 is transmitted on a resource block $RB_z$. There is a mapping relationship between resource locations of the resource blocks $RB_x$, $RB_y$, and $RB_z$. Optionally, the resource locations of the resource blocks $RB_x$, $RB_y$, and $RB_z$ have a specific offset. The offset is known to the transmit end and the receive end, and the receive end may learn of the resource locations of the resource blocks $RB_y$ and $RB_z$ based on the location of the resource block $RB_x$ and the offset. Optionally, there is a specific function relationship between the resource locations of the resource blocks $RB_x$, $RB_y$, and $RB_z$. The function relationship is known to the transmit end and the receive end, and the receive end may learn of the resource locations of the resource blocks $RB_y$ and $RB_z$ based on the location of the resource block $RB_x$ and the function relationship. The receive end demodulates different redundancy versions on corresponding resource blocks based on the resource locations of the resource blocks $RB_x$, $RB_y$, and $RB_z$, and performs combination, to obtain a diversity gain.

In addition to the foregoing adaptive transmission method 400 for satellite communication, this application further provides a method 700 for transmitting a redundancy version based on a signal-to-noise ratio (SNR). In the method 700, there is no need to perform a HARQ retransmission, and the transmit end does not need to wait for an ACK/NACK feedback from the receive end. For a specific method procedure, refer to FIG. 7. For a simulated transmission process, refer to FIG. 8.

Figure 7:
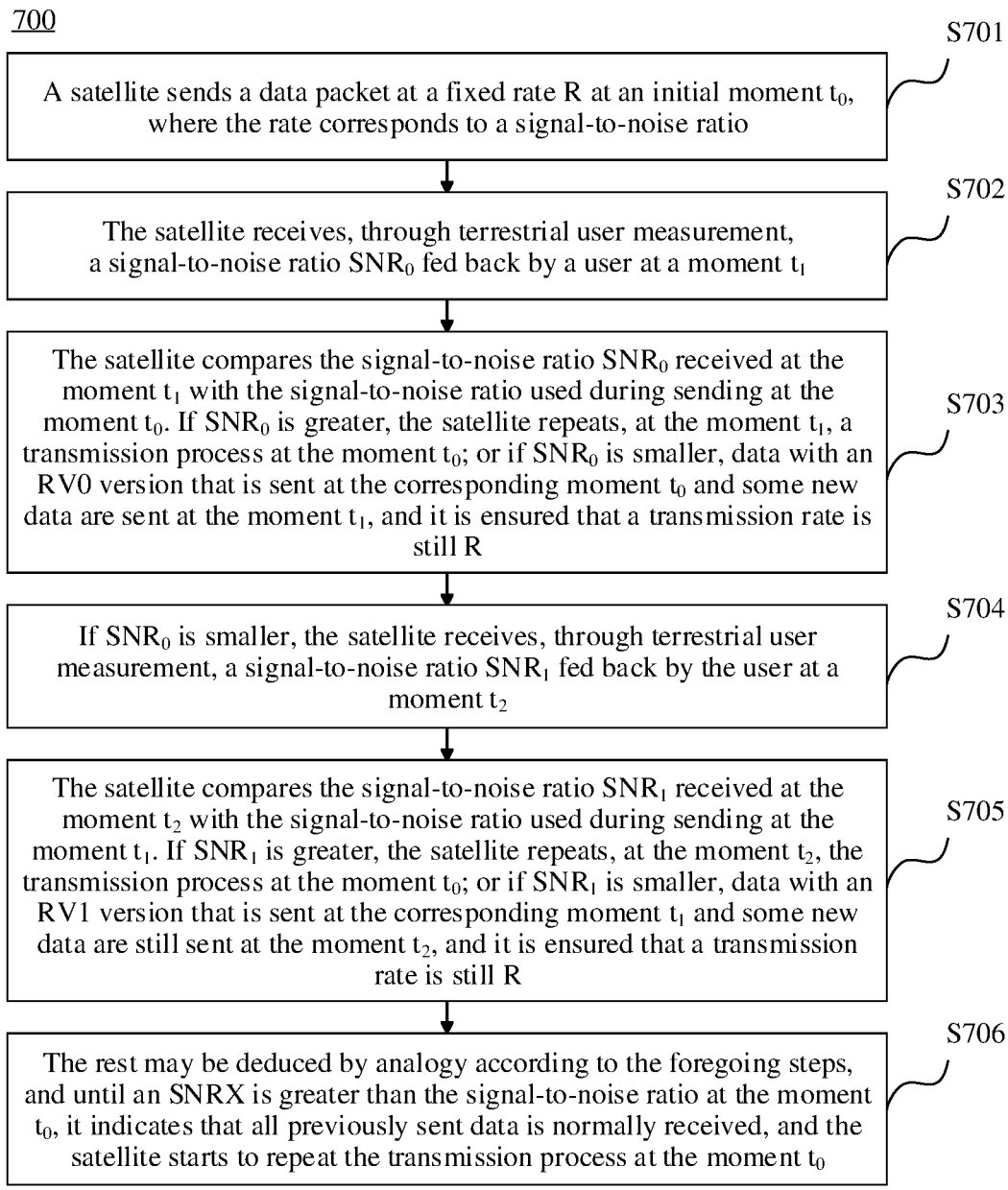
FIG. 7 is a schematic flowchart of a method 700 for transmitting a redundancy version based on a signal-to-noise ratio according to this application.
Figure 8:
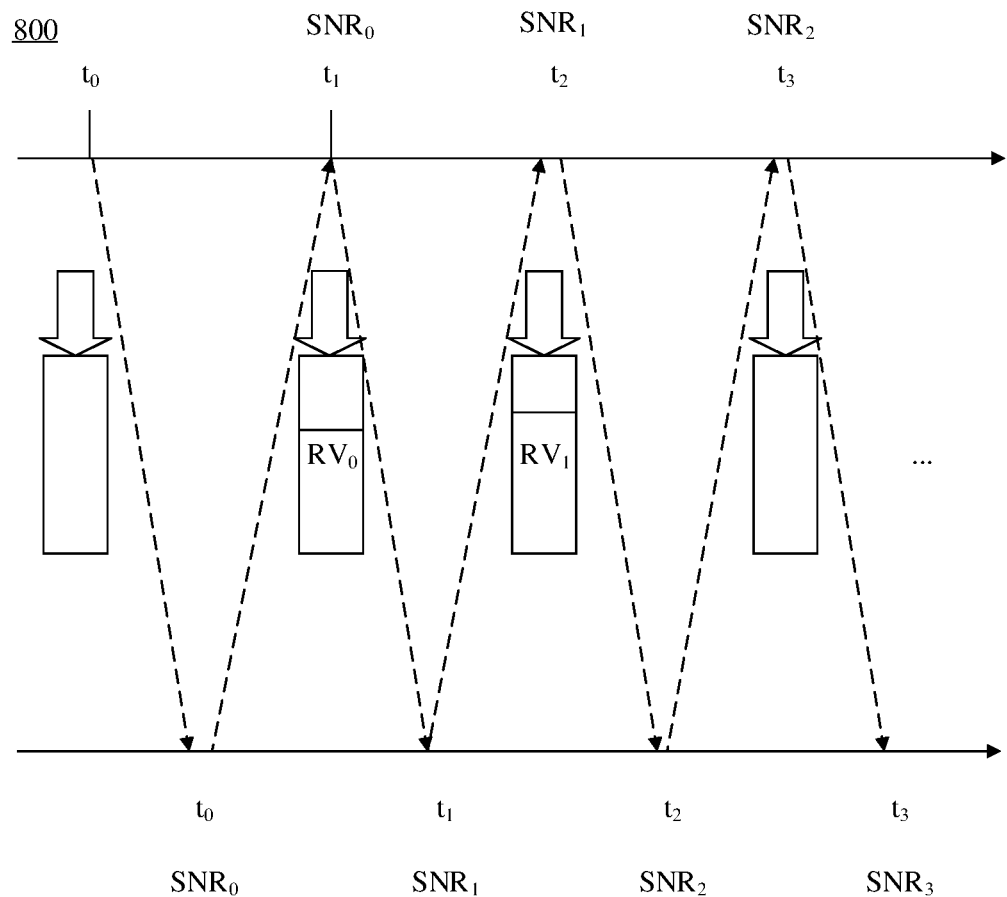
FIG. 8 shows an analog transmission process of the method 700 for transmitting a redundancy version based on a signal-to-noise ratio according to this application.

FIG. 7 is a schematic flowchart of a method 700 for transmitting a redundancy version based on a signal-to-noise ratio according to this application. A specific procedure of the method is as follows.

701. A satellite sends a data packet at a fixed rate R=B $\log_2(1+\gamma)$ an initial moment $t_0$, where the rate corresponds to a signal-to-noise ratio $\gamma$.

702. The satellite receives, through terrestrial user measurement, a signal-to-noise ratio $SNR_0$ fed back by a user at a moment $t_1$.

Because of a transmission delay of the satellite, the signal-to-noise ratio $SNR_0$ is a signal-to-noise ratio received by the satellite at the moment $t_1$ after the transmission delay from the moment $t_0$.

703. The satellite compares the signal-to-noise ratio $SNR_0$ received at the moment $t_1$ with the signal-to-noise ratio $\gamma$ used during sending at the moment $t_0$. If $SNR_0 > \gamma$, a transmission process at the moment $t_0$ is repeated at the moment $t_1$; or if $SNR_0 < \gamma$, data with an RV0 version that is sent at the corresponding moment $t_0$ and some new data are sent at the moment $t_1$, and it is ensured that a transmission rate is still R.

If $SNR_0 > \gamma$, it indicates that actual channel quality is better than expected channel quality when the data is sent at the fixed rate R, and it is considered that the previous data is normally received, and the satellite repeats, at the moment $t_1$, the transmission process at the moment $t_0$.

If $SNR_0 < \gamma$, it indicates that actual channel quality is worse than expected channel quality when the data is sent at the fixed rate R, it is considered that the previous data is not normally received, and the data with the RV0 version that is sent at the corresponding moment $t_0$ and some new data are sent at the moment $t_1$, and it is ensured that the transmission rate is still R, that is, the signal-to-noise ratio is still $\gamma$.

704. If $SNR_0 < \gamma$, the satellite receives, through terrestrial user measurement, a signal-to-noise ratio $SNR_1$ fed back by a user at a moment $t_2$.

Because of a transmission delay, the signal-to-noise ratio $SNR_1$ is a signal-to-noise ratio received by the satellite at the moment after the transmission delay from the moment $t_1$.

705. The satellite compares the signal-to-noise ratio $SNR_1$ received at the moment $t_2$ with the signal-to-noise ratio $\gamma$ used during sending at the moment $t_1$. If $SNR_1 > \gamma$, the satellite repeats, at the moment $t_2$, the transmission process at the moment $t_0$; or if $SNR_1 < \gamma$, data with an RV1 version that is sent at the corresponding moment $t_1$ and some new data are still sent at the moment $t_2$, and it is ensured that a transmission rate is still R.

If $SNR_1 > \gamma$, it indicates that actual channel quality is better than expected channel quality when the data is sent at the fixed rate R, it is considered that all previous data is normally received, and a next data packet is continuously transmitted at the moment $t_2$.

If $SNR_1 < \gamma$, it indicates that actual channel quality is worse than expected channel quality when the data is sent at the fixed rate R, it is considered that the previous data is not normally received, and the data with an RV1 version that is sent at the corresponding moment $t_1$ and some new data are sent at the moment $t_2$, and it is ensured that the transmission rate is still R.

706. The rest may be deduced by analogy according to the foregoing steps, and until $SNR_x > \gamma$ (where x is an integer, and x≥1), it indicates that all previously sent data is normally received, and the satellite starts to repeat the transmission process at the moment $t_0$.

This application provides two adaptive transmission methods for satellite communication in which a HARQ retransmission technology is not required.

Method 1: A receive end feeds back a redundancy version index, and a transmit end performs transmission in different diversity modes based on a redundancy version corresponding to the redundancy version index fed back by the receive end. In the method, the HARQ retransmission is not required, and a transmission delay of a satellite communication system is reduced. In addition, diversity transmission can be used to obtain a diversity transmission gain and a coding gain, thereby improving data transmission reliability.

Method 2: A proper redundancy version is selected for transmission based on a signal-to-noise ratio measured and fed back by a terrestrial user, and a HARQ retransmission is not required, thereby reducing a transmission delay of a satellite communication system and ensuring data transmission reliability.

A satellite base station and a terminal device communicate with each other by using a wireless technology. When the satellite base station sends a redundancy version of a data packet, the satellite base station is a transmit end, and when the satellite base station receives the redundancy version of the data packet, the satellite base station is a receive end. On the contrary, when the terminal device sends a redundancy version of a data packet, the terminal device is a transmit end, and when the terminal device receives the redundancy version of the data packet, the terminal device is a receive end.

Figure 9:
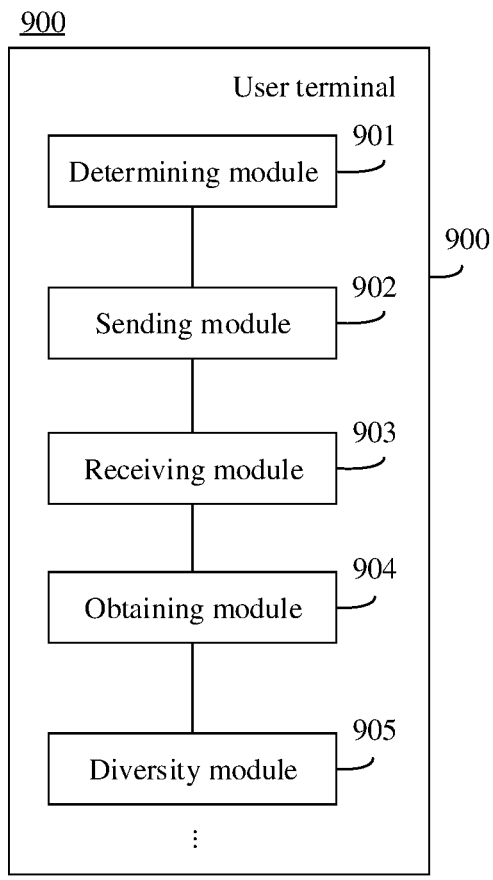
FIG. 9 is a schematic structural diagram of a user terminal 900 according to this application.

FIG. 9 is a schematic structural diagram of a user terminal 900 according to this application. The user terminal 900 performs an operation at a receive end, and the user terminal 900 includes: a determining module 901, configured to determine a redundancy version index; and a sending module 902, configured to feed back the redundancy version index to a satellite base station.

Optionally, the user terminal 900 further includes an encoding module 906, configured to perform channel coding on the redundancy version index, to obtain a bit sequence obtained after the channel coding.

Optionally, the user terminal 900 further includes a modulation module 907, configured to perform quadrature phase shift keying (QPSK) modulation on the bit sequence obtained after the channel coding on the redundancy version index, to obtain a complex symbol sequence.

Optionally, the user terminal 900 further includes a mapping module 908, configured to map the complex symbol sequence to a transmission resource of an uplink control channel for transmission, and finally transmit the complex symbol sequence to the satellite base station.

Optionally, the encoding module 906 is further configured to perform channel coding on uplink transmission data, to obtain a bit sequence obtained after the channel coding on the uplink transmission data.

Optionally, the user terminal 900 further includes a multiplexing module 909, configured to multiplex the bit sequence obtained after the channel coding on the redundancy version index and the bit sequence obtained after the channel coding on the uplink transmission data, to obtain a multiplexed bit sequence.

Optionally, the modulation module 907 is further configured to perform quadrature phase shift keying (QPSK) modulation on the bit sequence multiplexed by the bit sequence obtained after the channel coding on the redundancy version index and the bit sequence obtained after the channel coding on the uplink transmission data, to obtain a complex symbol sequence.

Optionally, the mapping module 908 is further configured to map the complex symbol sequence to a transmission resource of an uplink data channel for transmission, and finally transmit the complex symbol sequence to the satellite base station.

The user terminal may further perform an operation at a transmit end. If the user terminal performs the operation at the transmit end, the user terminal includes: a receiving module 903, configured to receive a redundancy version index signal fed back by a satellite base station; an obtaining module 904, configured to obtain, based on an obtained redundancy version index and a correspondence between a redundancy version index and a redundancy version combination, a corresponding redundancy version combination; and a diversity module 905, configured to select a proper diversity mode for transmission based on the obtained redundancy version combination.

Optionally, the user terminal further includes a demodulation module 910, configured to demodulate the received redundancy version index signal.

Optionally, the user terminal further includes a decoding module 911, configured to decode the demodulated redundancy version index signal.

Optionally, the user terminal further includes a communications module 912, configured to implement service communication between the user terminal and the satellite base station.

Figure 10:
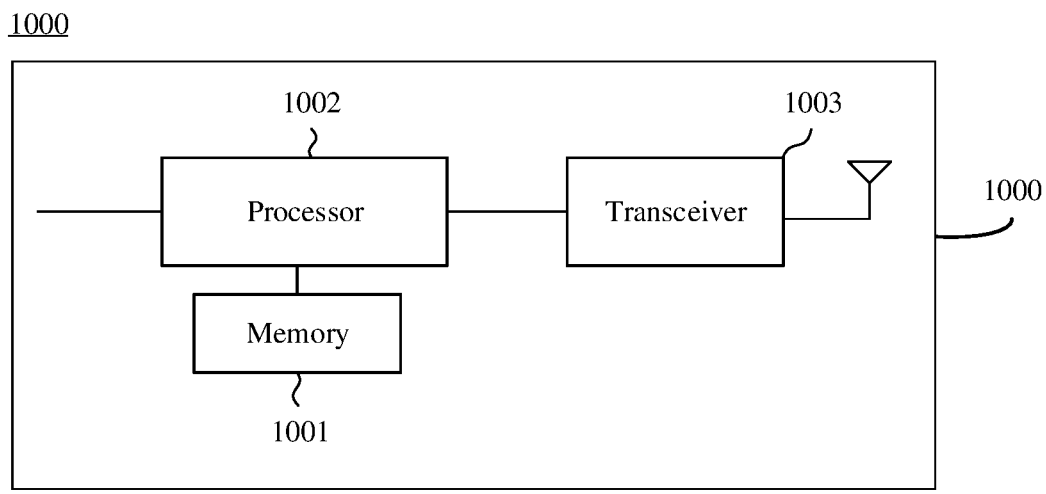
FIG. 10 is a schematic structural diagram of a user terminal 1000 according to this application.

FIG. 10 is a schematic structural diagram of a user terminal 1000 according to this application. The user terminal 1000 includes: a memory 1001, configured to store a computer program instruction; and a processor 1002, configured to execute the program stored in the memory.

When the program is executed, the processor executes the computer program instruction stored in the memory, so that the user terminal implements the processing operation performed by the user terminal in any one of the foregoing embodiments.

Optionally, the user terminal 1000 further includes a transceiver 1003. When the program is executed, the processor executes the computer program instruction stored in the memory, so that the transceiver 1003 of the user terminal 1000 implements the receiving and sending steps performed by the user terminal in any one of the foregoing embodiments.

Figure 11:
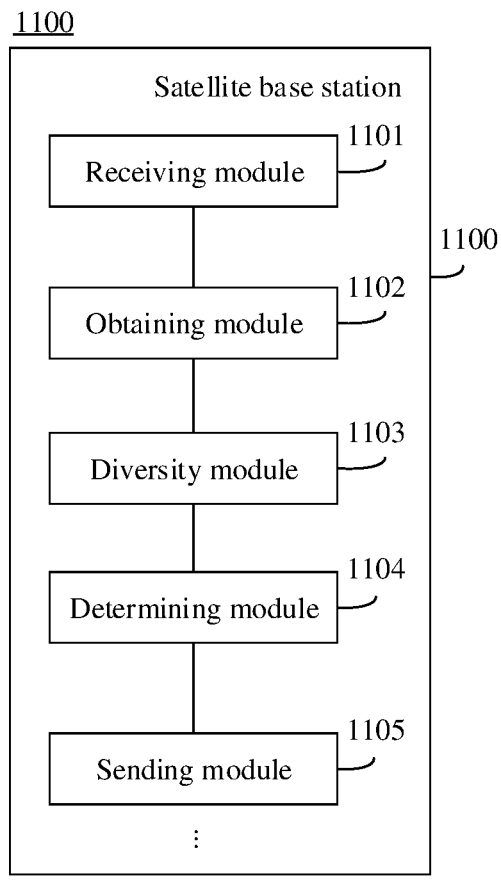
FIG. 11 is a schematic structural diagram of a satellite base station 1100 according to this application.

FIG. 11 is a schematic structural diagram of a satellite base station 1100 according to this application. The satellite base station 1100 performs an operation at a transmit end, and the satellite base station 1100 includes: a receiving module 1101, configured to receive a redundancy version index signal fed back by a user terminal; an obtaining module 1102, configured to obtain, based on an obtained redundancy version index and a correspondence between a redundancy version index and a redundancy version combination, a corresponding redundancy version combination; and a diversity module 1103, configured to select a proper diversity mode for transmission based on the obtained redundancy version combination.

Optionally, the satellite base station 1100 further includes a demodulation module 1106, configured to demodulate the received redundancy version index signal.

Optionally, the satellite base station 1100 further includes a decoding module 1107, configured to decode the demodulated redundancy version index signal.

Optionally, the satellite base station 1100 further includes a communications module 1108, configured to implement service communication between the satellite base station 1100 and the user terminal.

The satellite base station 1100 may further perform an operation at a receive end. If the satellite base station performs the operation at the receive end, the satellite base station includes: a determining module 1104, configured to determine a redundancy version index; and a sending module 1105, configured to transmit a redundancy version in a proper diversity mode.

Optionally, the satellite base station 1100 further includes an encoding module 1109, configured to perform channel coding on the redundancy version index, to obtain a bit sequence obtained after the channel coding.

Optionally, the satellite base station 1100 further includes a modulation module 1110, configured to perform quadrature phase shift keying (QPSK) modulation on the bit sequence obtained after the channel coding on the redundancy version index, to obtain a complex symbol sequence.

Optionally, the satellite base station 1100 further includes a mapping module 1111, configured to map the complex symbol sequence to a transmission resource of an uplink control channel for transmission, and finally transmit the complex symbol sequence to the user terminal.

Optionally, the encoding module 1109 is farther configured to perform channel coding on uplink transmission data, to obtain a bit sequence obtained after the channel coding on the uplink transmission data.

Optionally, the satellite base station further includes a multiplexing module 1112, configured to multiplex the bit sequence obtained after the channel coding on the redundancy version index and the bit sequence obtained after the channel coding on the uplink transmission data, to obtain a multiplexed bit sequence.

Optionally, the modulation module 1110 is further configured to perform quadrature phase shift keying (QPSK) modulation on the bit sequence multiplexed by the bit sequence obtained after the channel coding on the redundancy version index and the bit sequence obtained after the channel coding on the uplink transmission data, to obtain a complex symbol sequence.

Optionally, the mapping module 1111 is further configured to map the complex symbol sequence to a transmission resource of an uplink data channel for transmission, and finally transmit the complex symbol sequence to the user terminal.

Figure 12:
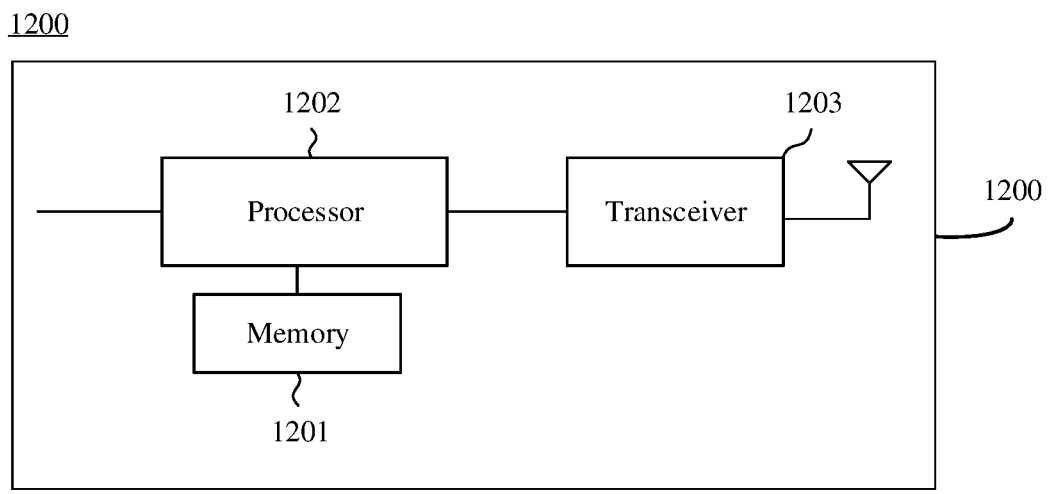
FIG. 12 is a schematic structural diagram of a satellite base station 1200 according to this application.

FIG. 12 is a schematic structural diagram of a satellite base station 1200 according to this application. The satellite base station 1200 includes: a memory 1201, configured to store a computer program instruction; and a processor 1202, configured to execute the program stored in the memory.

When the program is executed, the processor executes the computer program instruction stored in the memory, so that the satellite base station 1200 implements the processing operation performed by the satellite base station in any one of the foregoing embodiments.

Optionally, the satellite base station farther includes a transceiver 1203. When the program is executed, the processor executes the computer program instruction stored in the memory, so that the transceiver 1203 of the satellite base station 1200 implements the receiving and sending steps performed by the satellite base station in any one of the foregoing embodiments.

An embodiment of this application further provides a computer-readable medium. The computer-readable medium stores a computer program instruction, and when the computer program instruction is executed by a computer, the method performed by the user terminal or the satellite base station in any one of the foregoing embodiments is implemented.

An embodiment of this application further provides a computer program product. When the computer program product is executed by a computer, the method performed by the user terminal or the satellite base station in any one of the foregoing embodiments is implemented.

An embodiment of this application further provides a satellite communication system. The satellite communication system includes a user terminal and a satellite base station. For example, the user terminal may be the user terminal 900 provided in the foregoing embodiment, and the satellite base station may be the satellite base station 1100 provided in the foregoing embodiment. Alternatively, the user terminal may be the user terminal 1000 provided in the foregoing embodiment, and the satellite base station may be the satellite base station 1200 provided in the foregoing embodiment.

An embodiment of this application further provides a system chip. The system chip includes a processing unit and a communications unit. The processing unit may be, for example, a processor. The communications unit may be, for example, an input/output interface, a pin, a circuit, or the like. The processing unit may execute a computer instruction, so that a chip in the communications apparatus performs the method performed by the user terminal or the satellite base station according to any one of the foregoing embodiments.

In the examples described in the embodiments of this application, units and method processes may be implemented by electronic hardware or a combination of computer software and electronic hardware. Whether the functions are performed by hardware or software depends on a particular application and a design constraint condition of the technical solutions. Persons skilled in the art may use different methods to implement the described functions for each particular application.

In the several embodiments provided in this application, it should be understood that the disclosed apparatus and method may be implemented in other manners. The described apparatus embodiments are merely examples. For example, the unit division is merely logical function division and may be other division in actual implementation. For example, a plurality of units or components may be combined or may be integrated into another system. Some steps in the method may be ignored or not performed. In addition, couplings or direct couplings or communication connections between the units may be implemented by using some interfaces, and the interfaces may be implemented in electronic, mechanical, or other forms.

The units described as separate parts may or may not be physically separate, and may be located in one location or may be distributed on a plurality of network units. In addition, functional units in the embodiments of this application may be integrated into one processing unit, or each of the units may exist alone physically, or two or more units are integrated into one unit.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instruction may be stored in a computer-readable storage medium, or may be transmitted by using the computer-readable storage medium. The computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, a magnetic tape, a USB flash drive, a read-only memory (ROM), or a random-access memory (RAM)), an optical medium (for example, a CD or a digital versatile disc (DVD)), a semiconductor medium (for example, a solid-state drive (SSD)), or the like.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application. Although this application is described herein with reference to the embodiments, in a procedure of implementing this application that claims protection, persons skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of a plurality. A single processor or another unit may implement several functions enumerated in the claims. Some measures are described in dependent claims that are different from each other, but this does not mean that these measures cannot be combined to produce a better effect.

Although this application is described with reference to specific features and the embodiments thereof, it is clear that various modifications and combinations may be made to them without departing from the protection scope of this application. Correspondingly, this specification and the accompanying drawings are merely example descriptions of this application defined by the appended claims, and are considered as any of or all modifications, variations, combinations, or equivalents that cover the scope of this application. Certainly, persons skilled in the art can make various modifications and variations to this application without departing from the protection scope of this application. This application is intended to cover these modifications and variations of this application provided that they fall within the scope of the claims of this application and equivalent technologies thereof.

What is claimed is:

1. A method, comprising:
    determining, by a receive end, a redundancy version based on channel quality, or based on a signal-to-noise ratio and a bit error rate curve;
    determining, by the receive end, a redundancy version index based on a correspondence between the redundancy version index and a redundancy version combination, wherein the redundancy version combination comprises one or more redundancy versions including the determined redundancy version; and
    feeding back, by the receive end, the redundancy version index to a transmit end.

2. The method according to claim 1, wherein feeding back, by the receive end, the redundancy version index to the transmit end comprises:
    performing, by the receive end, channel coding on the redundancy version index, to obtain a channel coded bit sequence;
    performing, by the receive end, quadrature phase shift keying (QPSK) modulation on the channel coded bit sequence, to obtain a complex symbol sequence;
    mapping, by the receive end, the complex symbol sequence to a transmission resource of an uplink control channel for transmission; and
    transmitting the complex symbol sequence to the transmit end using the transmission resource.

3. The method according to claim 1, wherein feeding back, by the receive end, the redundancy version index to the transmit end comprises:
    performing, by the receive end, channel coding on the redundancy version index, to obtain a channel coded first bit sequence;
    performing, by the receive end, channel coding on uplink transmission data, to obtain a channel coded second bit sequence;
    multiplexing, by the receive end, the channel coded first bit sequence and the channel coded second bit sequence, to obtain a multiplexed third bit sequence; and
    interleaving and modulating, by the receive end, the multiplexed third bit sequence, mapping the multiplexed third bit sequence to a transmission resource of an uplink data channel for transmission, and transmitting the multiplexed third bit sequence to the transmit end using the transmission resource.

4. The method according to claim 3, wherein a scheme in which the receive end performs the channel coding on the redundancy version index comprises: a convolutional code, a polar code, or a Reed-Muller (RM) coding.

5. The method according to claim 3, wherein multiplexing, by the receive end, the channel coded first bit sequence and the channel coded second bit sequence, to obtain the multiplexed third bit sequence, comprises:
    attaching, by the receive end, the channel coded first bit sequence to the channel coded second bit sequence, to obtain the multiplexed third bit sequence.

6. The method according to claim 3, wherein multiplexing, by the receive end, the channel coded first bit sequence and the channel coded second bit sequence, to obtain the multiplexed third bit sequence, comprises:
    inserting, by the receive end, the channel coded first bit sequence into the channel coded second bit sequence, to obtain the multiplexed third bit sequence.

7. The method according to claim 3, wherein multiplexing, by the receive end, the channel coded first bit sequence and the channel coded second bit sequence, to obtain the multiplexed third bit sequence, comprises:

alternately interleaving, by the receive end, the channel coded first bit sequence and the channel coded second bit sequence in a per-bit sequence, to obtain the multiplexed third bit sequence.

8. The method according to claim 1, wherein the correspondence between the redundancy version index and the redundancy version combination comprises that:
a redundancy version in the redundancy version combination that corresponds to the redundancy version index comprises all bits in a systematic bit sequence.

9. A method, comprising:
obtaining, by a transmit end, a redundancy version index signal;
obtaining, by the transmit end, a redundancy version index based on the redundancy version index signal;
obtaining, by the transmit end based on the obtained redundancy version index and a correspondence between the redundancy version index and a redundancy version combination, a redundancy version combination corresponding to the redundancy version index; and
selecting, by the transmit end based on the obtained redundancy version combination, a diversity mode to transmit data.

10. The method according to claim 9, wherein selecting, by the transmit end based on the obtained redundancy version combination, the diversity mode to transmit data comprises:
transmitting redundancy versions comprised in the redundancy version combination on continuous resource blocks.

11. The method according to claim 10, wherein selecting, by the transmit end based on the obtained redundancy version combination, the diversity mode to transmit data comprises:
transmitting redundancy versions comprised in the redundancy version combination on discontinuous resource blocks, wherein there is a mapping relationship or a function relationship between resource locations of the discontinuous resource blocks used to transmit the redundancy versions.

12. A terminal device, comprising:
a processor; and
a non-transitory computer-readable storage medium storing a program that is executable by the processor, the program including instructions for:
determining a redundancy version based on channel quality, or based on a signal-to-noise ratio and bit error rate curve;
determining a redundancy version index based on a correspondence between a redundancy version index and a redundancy version combination, wherein the redundancy version combination comprises one or more redundancy versions including the determined redundancy version; and
feeding back the redundancy version index to a satellite base station through an uplink control channel or an uplink data channel.

13. The terminal device according to claim 12, wherein the program further includes instructions for:
performing channel coding on the redundancy version index, to obtain a channel coded bit sequence.

14. The terminal device according to claim 13, wherein the program further includes instructions for:
performing quadrature phase shift keying (QPSK) modulation on the channel coded bit sequence, to obtain a complex symbol sequence; and
mapping the complex symbol sequence to a transmission resource of the uplink control channel for transmission, and transmitting the complex symbol sequence to the satellite base station using the transmission resource.

15. The terminal device according to claim 12, wherein the program further includes instructions for:
performing channel coding on the redundancy version index, to obtain a channel coded first bit sequence; and
performing channel coding on uplink transmission data, to obtain a channel coded second bit sequence.

16. The terminal device according to claim 15, wherein the program further includes instructions for:
multiplexing the channel coded first bit sequence and the channel coded second bit sequence, to obtain a multiplexed third bit sequence;
interleaving the multiplexed third bit sequence, to obtain an interleaved fourth bit sequence;
performing quadrature phase shift keying (QPSK) modulation on the interleaved fourth bit sequence, to obtain a modulated fifth bit sequence; and
mapping the modulated fifth bit sequence to a transmission resource of the uplink data channel for transmission, and transmitting the modulated fifth bit sequence to the satellite base station using the transmission resource.

* * * * *